US012154387B2

United States Patent
Farjadrad et al.

(10) Patent No.: US 12,154,387 B2
(45) Date of Patent: Nov. 26, 2024

(54) SELF-DIAGNOSIS FOR IN-VEHICLE NETWORKS

(71) Applicant: MARVELL ASIA PTE LTD, Singapore (SG)

(72) Inventors: Ramin Farjadrad, Los Altos, CA (US); Dance Wu, Palo Alto, CA (US); Xing Wu, Palo Alto, CA (US); Shaoan Dai, San Jose, CA (US); Wensheng Sun, San Jose, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 369 days.

(21) Appl. No.: 17/396,710

(22) Filed: Aug. 8, 2021

(65) Prior Publication Data

US 2022/0044495 A1 Feb. 10, 2022

Related U.S. Application Data

(60) Provisional application No. 63/116,592, filed on Nov. 20, 2020, provisional application No. 63/062,850, filed on Aug. 7, 2020.

(51) Int. Cl.
G07C 5/00 (2006.01)
G06N 3/04 (2023.01)
G07C 5/08 (2006.01)

(52) U.S. Cl.
CPC .............. G07C 5/006 (2013.01); G06N 3/04 (2013.01); G07C 5/0808 (2013.01)

(58) Field of Classification Search
None
See application file for complete search history.

(56) References Cited

U.S. PATENT DOCUMENTS

| 8,639,468 B2* | 1/2014 | Cloetens | G06F 1/206 |
| | | | 702/132 |
| 10,554,521 B1* | 2/2020 | Terechko | H04L 43/0835 |
| 11,353,517 B1* | 6/2022 | Dewan | G01R 19/2506 |
| 2017/0134215 A1* | 5/2017 | Chini | H04L 41/0631 |
| 2019/0050515 A1 | 2/2019 | Su et al. | |
| 2019/0165921 A1 | 5/2019 | Wu | |
| 2019/0215030 A1 | 7/2019 | Nabki et al. | |
| 2019/0279447 A1* | 9/2019 | Ricci | B60R 25/01 |

(Continued)

FOREIGN PATENT DOCUMENTS

| CN | 102112855 A | * | 6/2011 | ............. G01K 7/42 |
| CN | 112736268 A | * | 4/2021 | ........ H01M 8/04298 |

(Continued)

OTHER PUBLICATIONS

Terven, Juan R. et al., "Loss Functions and Metrics in Deep Learning", arxiv, p. 5 (Year: 2023).*

(Continued)

*Primary Examiner* — Todd Melton
*Assistant Examiner* — Sarah A. Mueller

(57) ABSTRACT

Methods and systems are provided for fault diagnosis in a vehicular communication network. The methods and systems utilize a trained neural network model which is downloaded to a local computer associated with the vehicular communication network of a given vehicle and which applies inputs from the given vehicle to output maintenance recommendations for the given vehicle.

16 Claims, 6 Drawing Sheets

(56) References Cited

U.S. PATENT DOCUMENTS

| 2019/0379589 | A1 | 12/2019 | Ryan et al. | |
|---|---|---|---|---|
| 2021/0058168 | A1* | 2/2021 | Zang | H04B 17/29 |
| 2021/0141011 | A1 | 5/2021 | Ben Hassen et al. | |
| 2021/0351885 | A1* | 11/2021 | Chavva | H04B 7/0626 |
| 2021/0366207 | A1* | 11/2021 | Seidel | G07C 5/008 |
| 2022/0092321 | A1* | 3/2022 | Keiser | G06V 10/82 |
| 2023/0041290 | A1* | 2/2023 | Cooper | G06N 3/04 |

FOREIGN PATENT DOCUMENTS

| WO | 2019185657 A1 | 10/2019 |
|---|---|---|
| WO | 2020160761 A1 | 8/2020 |

OTHER PUBLICATIONS

IEEE Std. 802.3bw-2015, "IEEE Standard for Ethernet—Amendment 1: Physical Layer Specifications and Management Parameters for 100 Mb/s Operation over a Single Balanced Twisted Pair Cable (100BASE-T1)," IEEE Computer Society, pp. 1-88, Oct. 26, 2015.

IEEE Std. 802.3bp-2016, "IEEE Standard for Ethernet—Amendment 4: Physical Layer Specifications and Management Parameters for 1 Gb/s Operation over a Single Twisted-Pair Copper Cable," IEEE Computer Society, pp. 1-211, Jun. 30, 2016.

IEEE Std. P802.3cy Draft, "IEEE Standard for Ethernet—Amendment: Physical Layer Specifications and Management Parameters for Greater than 10 Gb/s Automotive Electrical Ethernet," IEEE Computer Society, Ethernet Working Group (C/LM/WG802.3), pp. 1-2, Nov. 15, 2019.

EP Application # 21210528.2 Search Report dated May 6, 2022.

Song et al., "Self-Supervised Anomaly Detection for In-Vehicle Network Using Noised Pseudo Normal Data," IEEE Transactions on Vehicular Technology, vol. 70, No. 2, pp. 1098-1108, Feb. 2021.

EP Application # 22176121.6 Search Report dated Nov. 16, 2022.

International Application # PCT/IB2021/057306 Search Report dated Nov. 26, 2021.

Lei et al., "Applications of Machine Learning to Machine Fault Diagnosis: A Review and Roadmap," Elsevier Ltd., Mechanical Systems and Signal Processing, vol. 138, article No. 106587, pp. 1-39, year 2019.

U.S. Appl. No. 17/533,177 Office Action dated Feb. 12, 2024.

U.S. Appl. No. 17/533,177 Office Action dated Mar. 29, 2024.

\* cited by examiner

SELF-DIAGNOSIS FOR IN-VEHICLE NETWORKS

CROSS-REFERENCE TO RELATED APPLICATIONS

This application claims the benefit of commonly owned U.S. Provisional Patent Application 63/062,850, filed Aug. 7, 2020, and U.S. Provisional Patent Application 63/116,592, filed Nov. 20, 2020, whose disclosures are incorporated herein by reference.

FIELD OF THE DISCLOSURE

The present disclosure relates generally to in-vehicle networks, and particularly to methods and systems for predicting the health of the in-vehicle networks and the health of components of these in-vehicle networks.

BACKGROUND

Modern vehicles, particularly including autonomous vehicles, operate while generating large amounts of data that is sensed or otherwise detected, analyzed, and transmitted over the in-vehicle network. This results in an increased need for reliable data transmission and high bandwidth in these in-vehicle networks, which may need to accommodate large amounts of data associated with artificial intelligence (AI), machine learning (ML) for data processing, time sensitive networks (TSN), vehicle security, and smart power distribution over cables and lines to minimize the amount of cable in the in-vehicle network.

The description above is presented as a general overview of related art in this field and should not be construed as an admission that any of the information it contains constitutes prior art against the present patent application.

SUMMARY

An embodiment that is described herein provides a method for fault diagnosis in a vehicular communication network. The method comprises: downloading a neural network trained model to a local computer associated with the vehicular communication network of a first vehicle (e.g., a given vehicle), the trained neural network model having been trained based on: 1) collected diagnostic information from components of the vehicular communication network of a plurality of second vehicles (e.g., typically different vehicles from the first or given vehicle) over a period of time; and 2) collected failure information of the components of the vehicular communication network in the plurality of second vehicles over the period of time; and the trained neural network model having generated, based on the collected diagnostic information, a set of metrics indicating a likelihood of failure of the components to perform in a vehicular communication network in a specified manner; deploying the trained neural network model by the local computer; inputting diagnostic information from the components of the vehicular communication network of the first vehicle into the trained neural network model; and outputting maintenance recommendations based on the set of metrics generated by the trained neural network model.

In some embodiments, the outputting the maintenance recommendations includes responding to output from the trained neural network model corresponding to the diagnostic information inputted into the trained neural network model. In some embodiments, the inputting the diagnostic information comprises collecting information from sensors associated with components of the vehicular communication network in the first vehicle. In some embodiments, the collected diagnostic information and the output from the first vehicle are periodically provided to the trained neural network model to further train the trained neural network model. In some embodiments, the failure information from one or more of the first vehicle or the plurality of second vehicles is periodically provided to the trained neural network model to further train the trained neural network model.

In some embodiments, the diagnostic information is selected from a group of inputs including a channel quality index, a link quality metric, a temperature, a cable length, an accumulated time, a communication speed, a measure of interference, cable type, and chip voltage. In some embodiments, the inputting the diagnostic information comprises measuring and inputting one or more parameters associated with the channel quality index from one or more cables in the vehicular communication network of the first vehicle, including an overall insertion loss (IL), an overall return loss (RL), a near end RL and a far end RL, into the trained neural network model. In some embodiments, the inputting the diagnostic information comprises measuring and inputting one or more parameters associated with the link quality metric from a communication link in the network, including a signal to noise ratio (SNR) of the link and an error rate of the link, into the trained neural network model. In some embodiments, the inputting the diagnostic information for the temperature includes measuring and inputting one or more parameters including core temperature and junction temperature of an integrated circuit (IC) chip, at one or more locations on the IC chip, and, ambient temperature, into the trained neural network model. In some embodiments, the inputting the diagnostic information for the accumulated time includes measuring and inputting accumulated power up time and system time into the trained neural network model.

In some embodiments, the trained neural network model outputs one or more of: a link health indication, a system reliability indication, one or more warnings, a cable fault indication, a cable fault location, and an IC chip fault indication, which are members of the set of metrics generated by the trained neural network model. In some embodiments, the one or more warnings include channel warnings, communication quality warnings, and chip warnings.

An embodiment that is described herein provides a system for fault diagnosis in a vehicular communication network. The system comprises: a memory of a local computer associated with the vehicular communication network of a first vehicle (e.g., a given vehicle), the memory configured for storing a neural network trained model, and the neural network trained model having been trained based on: 1) collected diagnostic information from components of the vehicular communication network of a plurality of second vehicles over a period of time; and 2) collected failure information of the components of the vehicular communication network in the plurality of second vehicles over the period of time. The neural network trained model having generated, based on the collected diagnostic information, a set of metrics indicating a likelihood of failure of the components to perform in a vehicular communication network in a specified manner. The system also comprises a processor configured to: deploy the trained neural network model stored in the memory; obtain and input diagnostic information from the components of the vehicular communication network of the first vehicle into the deployed trained neural network model; and generate maintenance recommendations for the input diagnostic information from the components of the vehicular communication network of the first vehicle, based on the set of metrics generated by the trained neural network model.

In some embodiments, the processor is additionally configured to: generate the maintenance recommendations in response to output from the trained neural network model corresponding to the diagnostic information input into the trained neural network model. In some embodiments, the components of the vehicular communication network in the first vehicle comprise one or more sensors from which the diagnostic information is obtained. In some embodiments, the components of the vehicular communication network of the first vehicle comprise integrated circuit (IC) chips, from which the diagnostic information is obtained. In some embodiments, the components of the vehicular communication network include one or more cables, from which the diagnostic information is obtained.

An embodiment that is described herein provides a computer usable non-transitory storage medium having a computer program embodied thereon for causing a suitably programmed system to diagnose faults in a vehicular communication network, by performing the following steps when such program is executed on the system. The steps comprise: downloading a neural network trained model to a local computer associated with the vehicular communication network of a first vehicle, the trained neural network model having been trained based on: 1) collected diagnostic information from components of the vehicular communication network of a plurality of second vehicles over a period of time; and 2) collected information of failures of the components of the vehicular communication network in the plurality of second vehicles over the period of time; and the trained neural network model having generated, based on the collected diagnostic information, a set of metrics indicating a likelihood of failure of the components to perform in a vehicular communication network in a specified manner; causing deploying of the trained neural network model by the local computer; inputting diagnostic information from the components of the vehicular communication network of the first vehicle into the trained neural network model; and outputting maintenance recommendations based on the set of metrics generated by the trained neural network model.

The present disclosure will be more fully understood from the following detailed description of the embodiments thereof, taken together with the drawings in which:

DETAILED DESCRIPTION OF EMBODIMENTS

Figure 1A:
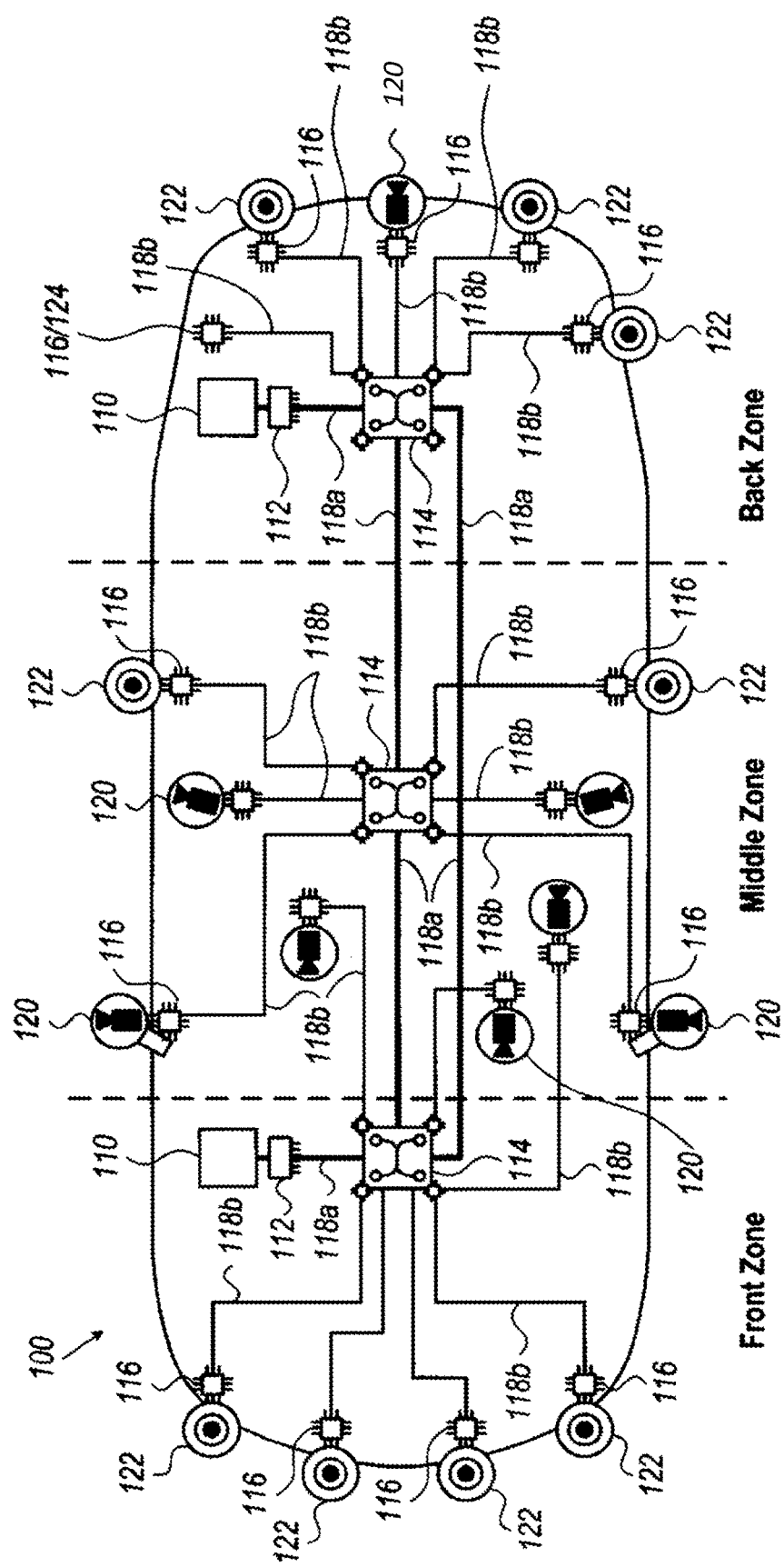
FIG. 1A is a block diagram of an example in-vehicle network in a vehicle, operating in accordance with an embodiment that is described herein.

FIG. 1A shows a vehicle 100 with an in-vehicle network, also known as a vehicular communication network, these terms used interchangeably herein. The vehicle 100, may be a standard non-autonomous vehicle, or an autonomous vehicle, classified at any of Society of Automotive Engineers (SAE) Levels, 0 No Automation, 1 Driver Assistance, 2 Partial Automation, 3 Conditional Automation, 4 High Automation, 5 Full Automation. The vehicular communication network includes, for example, integrated circuit (IC) chips for performing various functions, and voltages, currents, electromagnetic current (EMC), electromagnetic interference, and the like, of these IC chips are monitored continuously, typically upon vehicle start up, or at other intervals. There are also multiple cables, which connect the various components of the vehicular communication network.

The vehicular communication network includes processors 110, such as Central Processing Units (CPUs) and Graphics Processing Units (GPUs), which are representative of a vehicle computer, also known herein as a local computer. The processors 110 communicate with controllers 112 and switches/gateways 114, over Ethernet links 118a, directly or indirectly. The switches/gateways 114 communicate with each other over Ethernet links 118a, directly or indirectly. The switches/gateways 114 communicate with physical layer interfaces (PHYs) 116 over Ethernet links 118b, directly or indirectly.

The links 118a, 118b comprise, for example, cables for electronic and/or data transmissions. The cable types may be shielded or unshielded, single stranded or multi-stranded, with the multi-stranded cables being, for example, twisted pair cables. For example, the ethernet links 118a between the switches 114, controllers 112 and CPU/GPU 110 support 10/25 Gbps data rates, while the Ethernet links 118b between the switches 114 and the PHYs 116 support 2.5/5/10 Gpbs data rates.

Each of the PHYs 116 links to one of a camera 120, radar/lidar/sonar 122, or other suitable sensors 124, such as temperature sensors, magnetic field sensors, and the like. The PHYs 116 are configured such that they measure signal strength and/or intensity, as they typically are at the ends of the links 118b. By measuring the signal strength and/or intensity, parameters such as the insertion loss (IL) and return loss (RL) can be determined.

Figure 1B:
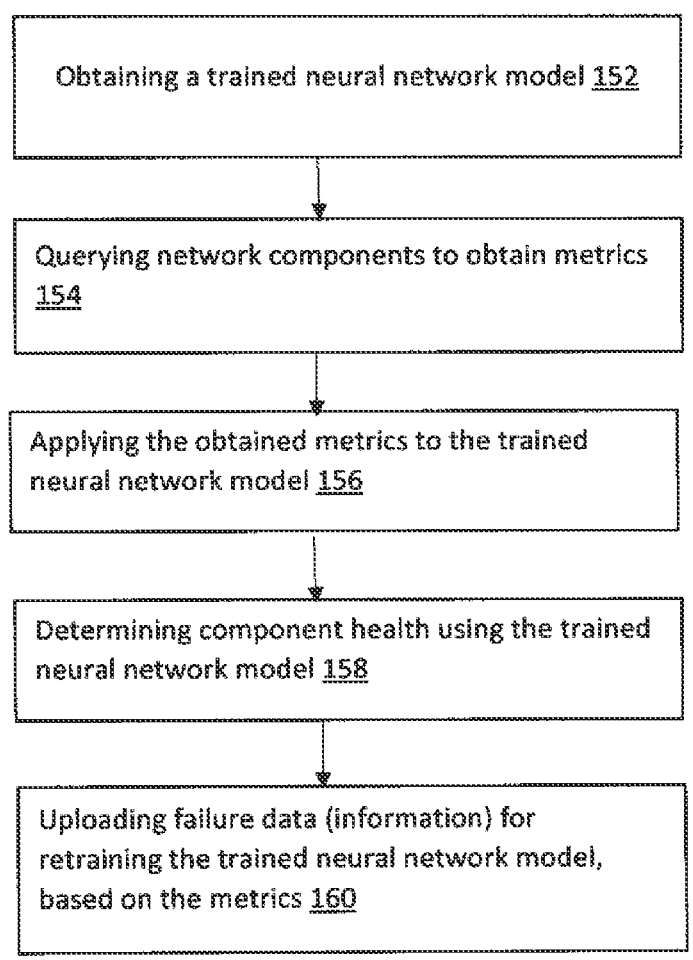
FIG. 1B is a diagram of an example process in accordance with an embodiment described herein.

The local computer, i.e., processor 110, in the vehicle 100, performs an example operation, which is shown at a high level in FIG. 1B, to which attention is now directed. At block 152, a trained neural network model is obtained by the local computer. This is typically achieved by the local computer 100 downloading the trained neural network model, from locations along a network, and/or the cloud. The process moves to block 154 where the trained neural network model queries components of the vehicular communication network to obtain metrics.

Moving to block 156, the metrics are applied to the trained neural network model. The trained neural network model is then used to determine health of the components of the vehicular communication network, for example, based on probabilities, at block 158. The process moves to block 160, where based on the obtained metrics, failure information (e.g., data and/or records) is uploaded by the trained neural network model to retrain the trained neural network model. The process may be repeated as desired.

Figure 2:
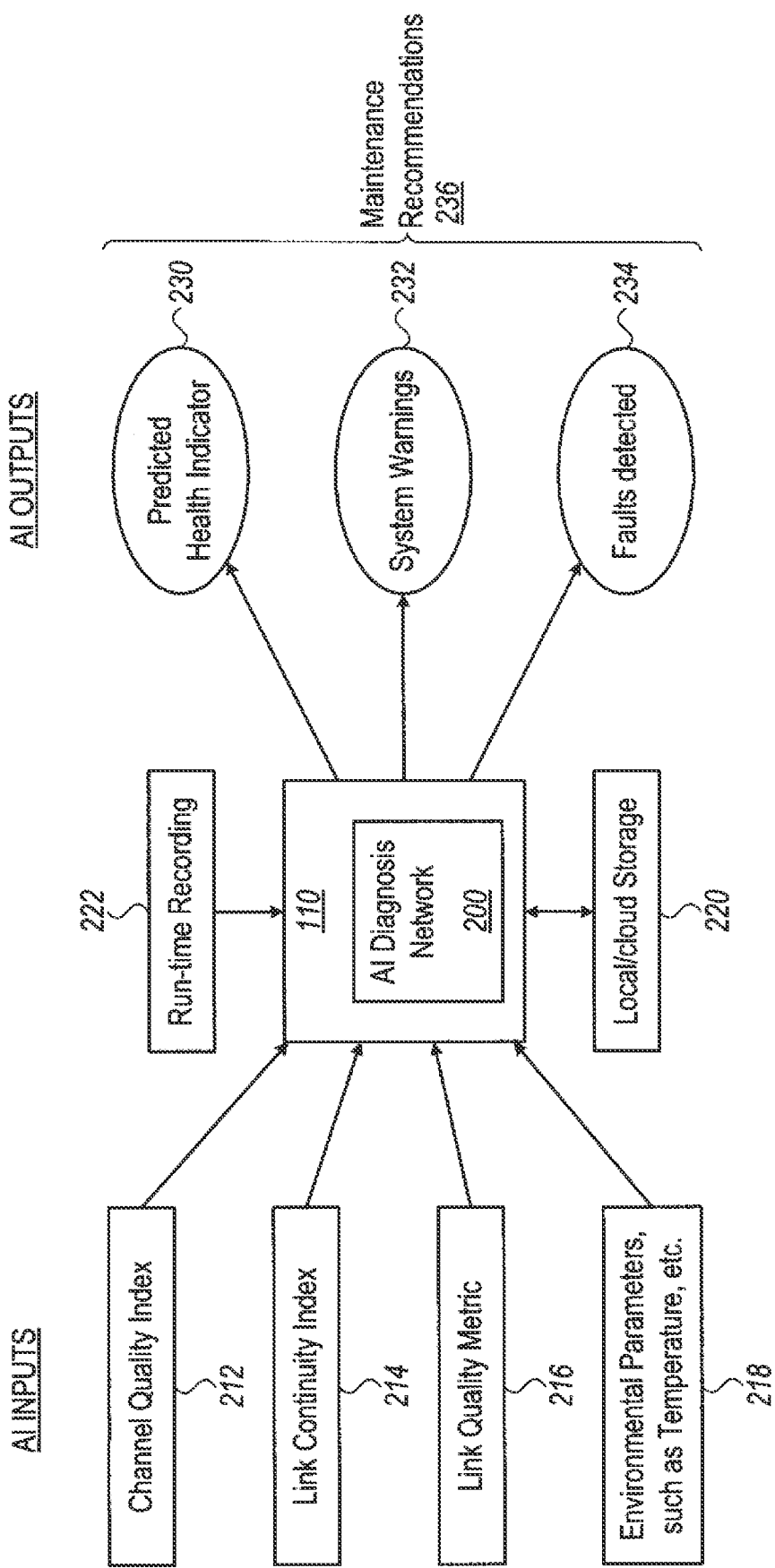
FIG. 2 is a block diagram that schematically illustrates a system architecture for ascertaining network health in the vehicle of FIG. 1A, in accordance with an embodiment that is described herein.

FIG. 2 is an architectural block diagram of a trained neural network model (e.g., an Artificial Intelligence (AI) model) 200, which is downloaded into the vehicle or local computer, i.e., typically one of the processors 110, in accordance with an embodiment of the disclosure. The trained neural network model 200 receives inputs, based on metrics, typically developed as a set of metrics for the trained neural network model 200, which are expressed as values or data and are computed on the basis of diagnostic information provided by sensors and interfaces in the in-vehicle network. The metrics include, for example, a channel quality index 212, an optional link continuity index 214, a link quality metric 216, and other metrics 218, for each communication link of the vehicular communication network.

In alternate embodiments, the aforementioned metrics are received responsively to periodic queries, for example, by an onboard processor 110 in the vehicle 100, or are received, for example, periodically in an automated manner.

Factors or values for analyzing the channel quality index 212, which, among other suitable metrics, include, for example, Insertion Loss (IL) and/or Return Loss (RL).

An optional link continuity index 214, for each communication link of the vehicular communication network, includes, for example, factors or values for Signal Reflection (Channel Return Loss). A link quality metric 216, includes factors or values such as, Link-up time, Bit Error Rate (BER), Signal to Noise (SNR) Margin. Other metrics 218, include for example, temperature, cable length, accumulated time, communication speed, a measure of interference (interference detection-electromagnetic vulnerability, shielding effectiveness), cable type, and chip voltage, and the like. All of the aforementioned metrics are computed with respect to each individual one of multiple links, cables, chips, and the like, in the vehicular communication network.

In an embodiment, the trained neural network model 200 is downloaded from remote locations over external networks, such as the Internet, and portions thereof may be stored in the cloud 220. There is also an associated module for run-time recording 222. For example, one or more of the inputs, for example, those of the input layer 302, may be recorded and stored in local or cloud storage media. The trained neural network model 200 running in the processor 110, outputs a set of metrics in response to inputted diagnostic information. The set of metrics are, for example, indications, including probabilities, of a likelihood of failure of components to perform in the vehicular communication network of the vehicle 100 in a specified manner. Example metrics include, predicted health indicators of components of the vehicular network 230, system warnings 232, and detected faults 234. The results of these metrics are analyzed, for example, by the processor 110, to determine and provide maintenance recommendations 236 for the vehicular network and the vehicle 100.

Figure 3:
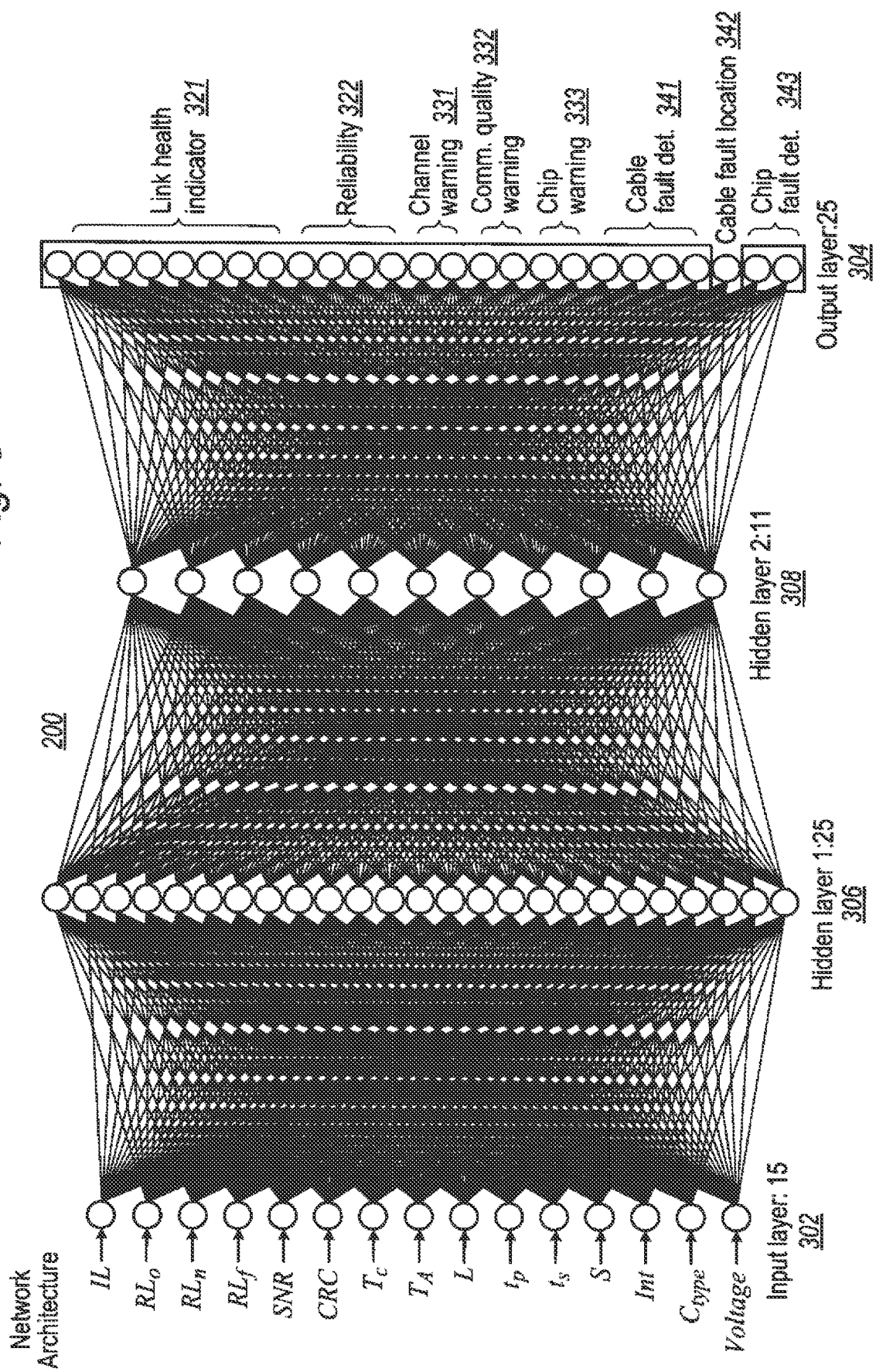
FIG. 3 is a diagram of an example trained neural network model for use in the system architecture of FIG. 2.

Attention is also directed to FIG. 3, which is a diagram of the network architecture for the neural network model 200, in accordance with an embodiment of the disclosure. The neural network model 200, for example, is a four layer fully connected neural network, with an input layer 302, and an output layer 304, with one or more hidden layers 306, 308, intermediate the input 302 and output 304 layers. The number of hidden layers and/or the size thereof, depends, for example, on the number of transformations to be made and the complexity of the transformations.

In an embodiment, the input layer 302 has 15 inputs, and the output layer 304 has 25 outputs. There are two hidden layers 306, 308, a first hidden layer 306 with a size of 25, and a second hidden layer 308, with a size of 11. The neural network model 200 includes, for example, an activation function of nodes which are sigmoid, or which are a rectified linear unit (ReLU), to perform the desired transformations.

This particular neural network architecture is shown here solely by way of example, and the principles of the present disclosure may alternatively be implemented in other sorts of neural network, with larger or smaller numbers of layers, and larger or smaller numbers of inputs, outputs, and nodes within each layer. The pictured neural network model 200 is applicable for diagnosis and fault detection in a particular communication link within the vehicular communication network, including a cable and one or more chips in this example. Typically, the processor 110 runs multiple models of this sort, to process diagnostic information with respect to multiple communication links and other components.

The neural network model, which is downloaded, for example, from the cloud or other centralized processor serving multiple vehicles, into the vehicle processor 110, is trained in accordance with an objective function. As the training typically consumes large amounts of power, the training may be done in the cloud. For discrete outputs, for example, the objective function is based on a cross-entropy (CE) expressed as:

$$CE := -\sum_{i=1}^{M} \{y_i \log \hat{y}_i + (1-y_i)\log(1-\hat{y}_i)\}$$

For continuous outputs, such as the fault location along a cable, the objective function is based on a mean-square-error (MSE). The final objective function is expressed as a weighted sum, with weights w1 and w2:

w1*CE+w2*MSE

Any suitable algorithm may be used to train the neural network model 200 based on this objective function. For example, the algorithm may be an Adam Optimization algorithm, and random initial weights may be used. The learning rate for the objective function can be controlled by adjusting the learning rate during training of the neural network model.

The trained neural network model 200 is trained, for example, in a remote server along a network or in the cloud. The training of the neural network model is, for example, by receiving inputs from numerous vehicles, different from the vehicle 100, which are uploaded to the neural network model. Training the neural network model using inputs from many vehicles is, for example, typically centralized, so that the trained model benefits from a large volume of inputs, so that the trained model can serve a given vehicle (e.g., typically an individual vehicle), such as the vehicle 100.

For example, the trained neural network model is trained based on: 1) collected diagnostic information from components of the vehicular communication network in a set or plurality of vehicles, different from the vehicle (e.g., the given vehicle) 100, to which the neural network model 200 is being downloaded to a local computer (e.g., processor 110) thereof, over a period of time; and 2) collected information (e.g., records) of failures (failure information) of the components of the vehicular communication network in the set of vehicles over the period of time. For example, the failure information (e.g., failure records) are obtained from numerous (e.g., multiple) vehicles. The collected diagnostic information and/or failure information are uploaded, for example, periodically, to a centralized processor for training the trained neural network model 200, where the trained neural network model 200 resides, such as along a network remote from the vehicle 100, the local computer 110 of the vehicle 100, or the cloud.

The neural network model is trained to generate, based on the collected diagnostic information, a set of metrics. The set of metrics indicates a likelihood of failure of the components of the vehicular communication network in the plurality of different vehicles to perform in the specified manner.

The trained neural network model is deployed, for example, as a software package (downloadable), for installation on the local vehicle 100 computer, e.g., processors 110. The trained neural network model is typically associated with an application programming interface (API) to update the trained neural network model 200.

The Input Layer 302 of the trained neural network model 200 includes a set of metrics, developed to determine the inputs, for example, from diagnostic information of the vehicle 100, for input into the trained neural network model 200. These metrics include, for example, a channel quality index 212, a link quality metric 216, and other metrics 218, including, for example, temperature, cable length, accumulated time, communication speed, a measure of interference (interference detection), cable type, and chip voltage.

The metric for channel quality index 212 is associated with one or more cables in the vehicular communication network of the vehicle 100. The metric 212 comprises one or more parameters, which serve as inputs to the trained neural network model of FIG. 3, including an overall insertion loss (IL) ($IL \in R^1$), an overall return loss ($RL_0$) ($RL_0 \in R^1$), a near end $RL_n$ ($RL_n \in R^1$), and a far end $RL_f$ ($RL_f \in R^1$).

The link quality metric 216 is associated with each communication link in the network and comprises one or more parameters, which serve as inputs to the trained neutral network model. These inputs include, for example, signal to noise ratio (SNR) of the link ($SNR \in R^1$), and an error rate of the link, such as a rate of failure of the cyclic redundancy check (CRC) of data frames transmitted over the link ($CRC \in R^1$).

The temperature (T) metric, expressed, for example, as ($T \in R^2$), comprises one or more parameters, which serve as inputs to the trained neutral network model. The inputs include, for example, one or more of core temperature and/or junction temperature of an integrated circuit (IC) chip ($T_C$), and ambient temperature ($T_A$), at various locations on the IC chip.

The cable length (L) metric, expressed, for example, as ($L \in R^1$), comprises a parameter indicating a length of the requisite cable, such as the length in meters.

The time or time information metric (t), expressed, for example, as ($t \in R^2$), comprises one or more parameters, which serve as inputs to the trained neutral network model 200. The inputs include, for example, one or more of accumulated time, including accumulated power up time ($t_p$), and system time ($t_s$).

The communication speed metric, expressed, for example, as ($S \in R^1$), comprises a parameter indicating the speed of a link, for example in terms of bits/sec or bandwidth.

The measure of interference or interference detection is a metric expressed, for example, as a binary integer value ($INT \in Z_2^1$), indicating whether interference above a certain threshold was detected on a given link, which serves an input (INT), to the trained neutral network model 200.

The cable type is a metric expressed, for example, as a binary integer value ($c_{type} \in Z_2^1$), expressed as a binary (zero) for a cable type of an unshielded twisted pair (UTP), and a binary 1 (one) for a cable type of a shielded twisted pair (STP), for input into the trained neutral network model 200.

The chip voltage metric, expressed, for example, as ($V \in R^1$), comprises a parameter, which indicates the operating voltage of an IC chip.

The aforementioned inputs are such that the total input size of the example trained neural network model is 15, with 13 continuous inputs, i.e., inputs belonging to the set of real numbers R, and two discrete inputs, belonging to the set of integers Z. The inputs are based on collected diagnostic information from the vehicle 100, which is collected from sensors associated with components of the vehicular communication network in the vehicle 100.

The output layer 304 of the trained neural network model 200 provides a set of output metrics. These output metrics generated by the trained neural network model 200, and associated with the output (of the output layer 304), include one or more of: a predicted health indicator 230, system warnings 232, and fault indications 234.

The predicted health indicator 230 metric includes outputs for link health indication 321 and system reliability 322.

The link health indication output 321 is, for example, over eight discrete levels of one-hot encoding of binary zeros and ones. Link health indication ranges from very poor, expressed as [1, 0, 0, 0, 0, 0, 0, 0], to excellent, expressed as [0, 0, 0, 0, 0, 0, 0, 1]. Alternatively, other encoding schemes can be used to express the link health indication, as well as the other outputs described below.

The system reliability output 322 is, for example, at four discrete levels using one-hot encoding of binary zeros and ones as follows:
Excellent=[1, 0, 0, 0]
Good=[0, 1, 0, 0]
Warning=[0, 0, 1, 0]
Fail=[0, 0, 0, 1]

Output for the system warnings metric 232 includes, for example, warnings such as channel warnings 331, communication quality warnings 332, and chip warnings 333.

The Channel Warning 331 is on two discrete levels, and represented by binary zeros and ones. The levels are:
No Warning=0
Warning=1

The Communication Quality Warning 332 is on two discrete levels, and is represented by binary zeros and ones. The levels are:
No Warning=0
Warning=1

The Chip Warning 333 is on two discrete levels, and is represented by binary zeros and ones. The levels are:
No Warning=0
Warning=1

Output for the fault detection metric 234 includes, for example, cable fault detection 341, cable fault location 342, and chip fault detection 343.

Cable fault detection 341 can detect, for example, where a cable is broken or has incurred other physical damage, by, for example, analyzing impedance mismatch. Cable fault detection is, for example, on four discrete levels and is one-hot encoded, based on binary zeros and ones as follows:
Short=[1, 0, 0, 0]
Open=[0, 1, 0, 0]
Short & Ground=[0, 0, 1, 0]
Short & Power=[0, 0, 0, 1]

There is an output for cable fault location 342, which is continuous and indicates the estimated distance to the fault from the end of the cable.

Chip fault detection 343 indicates, for example, the existence of a fault in an IC chip of the vehicular communication system of the vehicle 100. Chip fault detection is, for example, on two discrete levels and is one-hot encoded, based on binary zeros and ones as follows:
Good=[1, 0]

Fail=[0, 1]

For the above outputs, of which there are 25, 24 (e.g., link health indicator 321, system reliability 322, channel warning 331, communication quality warning 332, chip warning 333, cable fault detection 341, chip fault detection 343) are discrete, in that they have two or more distinct values, while one, cable fault location 342, is continuous.

The output metrics 230, 232, 234 and their respective outputs 321, 322, 331, 332, 333, 341, 342 and 343, are analyzed by the one or more of the processors 110 to output maintenance recommendations for the vehicle 100.

The trained neural network model 200 does not need to apply or otherwise input all 15 inputs at any given time, and also does not necessarily provide all of the outputs at any given time. Rather, one or more outputs are provided based on the one or more inputs provided to the trained neural network model 200. Accordingly, all 15 inputs do not need to be combined to render an outputted decision. Rather, each input may have its own separate computation by the trained neural network model 200, computed separately from other inputs.

In another example implementation, a complete set of diagnostic inputs in the vehicle is collected. For each desired decision, diagnostic inputs can be limited to those inputs that are relevant for the desired decision. Different trained neural network models, adjusted for the transformations which need to be performed to reach each desired decision, may be employed to render the desired decisions.

Additionally, the collected diagnostic information, the inputs from the input layer 302, and the outputs from the output layer 304 are, for example, periodically provided to the trained neural network model 200 to further train the trained neural network model 200. While training may be performed locally, training may also be performed in the cloud.

Figure 4A:
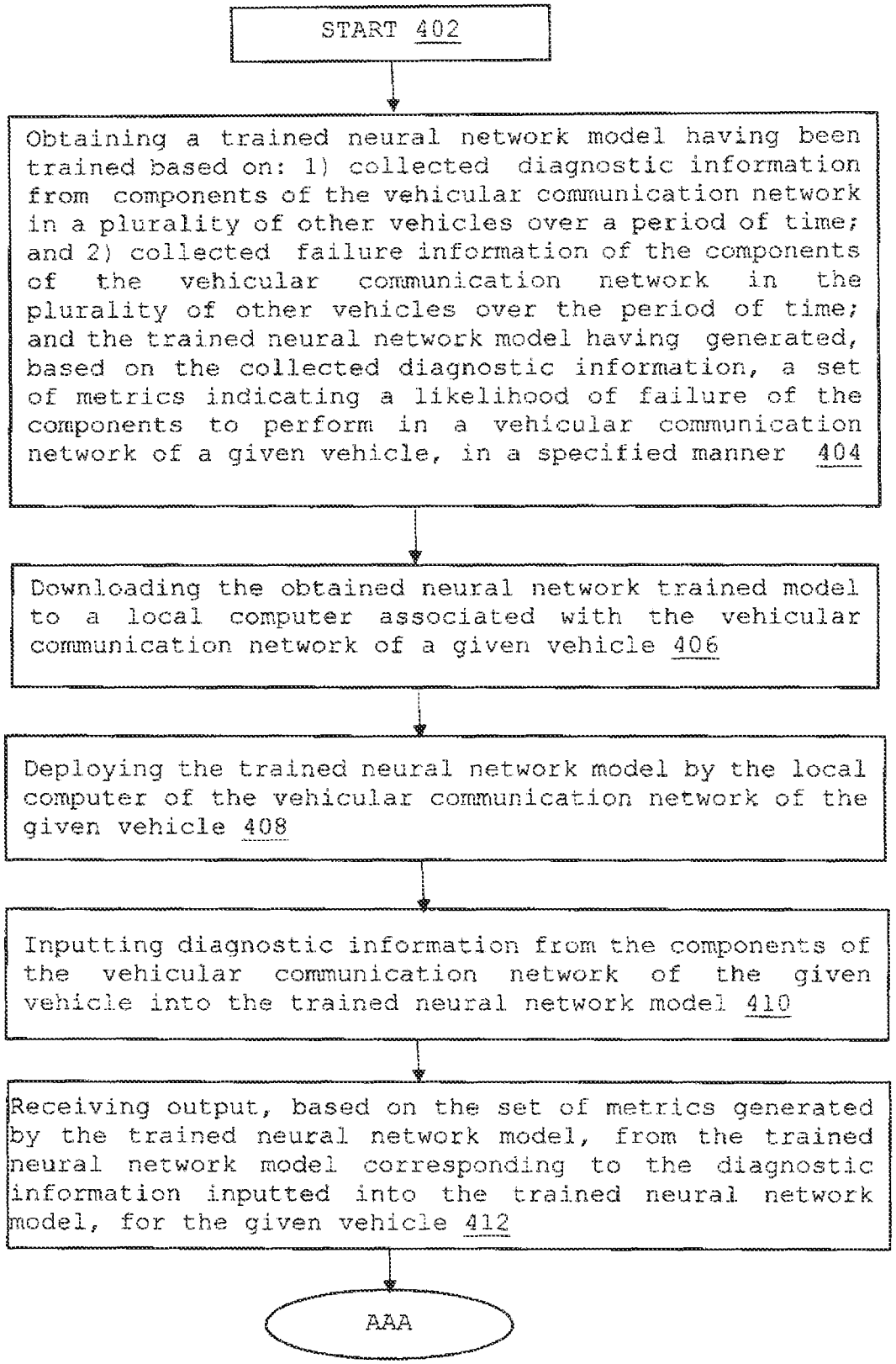
FIGS. 4A and 4B are a diagram of a process performed by the system of FIGS. 2 and 3.
Figure 4B:
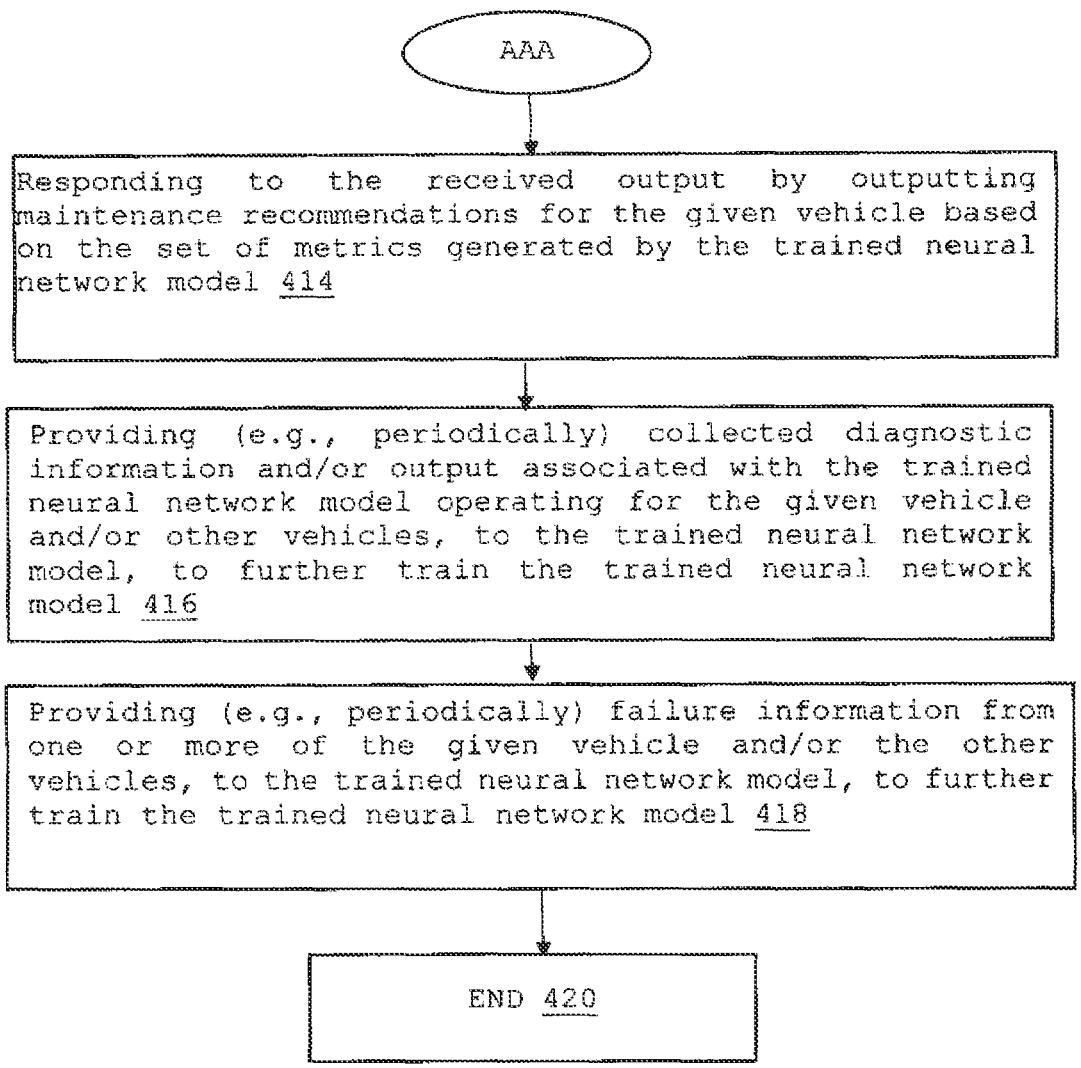

Attention is now directed to FIGS. 4A and 4B which show a flow diagram detailing a computer-implemented process in accordance with embodiments of the disclosed subject matter. The aforementioned process, which includes subprocesses, is performed, for example, automatically and/or in real time.

The process begins at a START block 402, where the local computer 110 of the vehicular communication network of the vehicle 100, i.e., a given vehicle, is activated. The process moves to block 404, where the local computer 110 obtains a trained neural network model 200 having been trained based on: 1) collected diagnostic information from components of the vehicular communication network in a plurality of other vehicles over a period of time; and 2) collected failure information of the components of the vehicular communication network in the plurality of other vehicles over the period of time; and the trained neural network model having generated, based on the collected diagnostic information, a set of metrics indicating a likelihood of failure of the components to perform in a vehicular communication network of a given vehicle, in a specified manner.

The process moves to block 406, where the local computer 110, associated with the vehicular communication network of the given vehicle 100, downloads the obtained neural network trained model 200. The local computer 110 then deploys the trained neural network model 200, at block 408.

The process moves to block 410, where diagnostic information from the components of the vehicular communication network of the given vehicle 100 is inputted into the trained neural network model 200. The diagnostic information is selected from a group of inputs including a channel quality index, a link quality metric, a temperature, a cable length, an accumulated time, a communication speed, a measure of interference, cable type, and chip voltage.

The inputting of the diagnostic information typically comprises measuring and inputting one or more parameters associated with the channel quality index from one or more cables in the vehicular communication network of the given vehicle 100, including an overall insertion loss (IL), an overall return loss (RL), a near end RL and a far end RL, into the trained neural network model 200. The inputting of the diagnostic information typically also comprises measuring and inputting one or more parameters associated with the link quality metric from a communication link in the network, including a signal to noise ratio (SNR) of the link and an error rate of the link, into the trained neural network model 200. The inputting of the diagnostic information for the temperature includes measuring and inputting one or more parameters including core temperature and junction temperature of an integrated circuit (IC) chip, at one or more locations on the IC chip, and, ambient temperature, into the trained neural network model 200. The inputting of the diagnostic information for the accumulated time includes measuring and inputting accumulated power up time and system time into the trained neural network model 200.

Moving to block 412, the local computer 110 receives output, rendered by the trained neural network model 200, based on the set of metrics generated by the trained neural network model 200. The output corresponds to the diagnostic information inputted into the trained neural network model 200, for the given vehicle 100. The trained neural network model 200 outputs one or more of: a link health indication, a system reliability indication, one or more warnings, a cable fault indication, a cable fault location, and an IC chip fault indication, which are members of the set of metrics generated by the trained neural network model. The warnings include, for example, channel warnings, communication quality warnings, and chip warnings.

The local computer 110 responds to the received output by outputting maintenance recommendations for the given vehicle 100 based on the set of metrics generated by the trained neural network model 200, at block 414.

The process moves to block 416, an optional subprocess, where the local computer 110, for example, periodically, provides the collected diagnostic information and/or output associated with the trained neural network model 200 operating for the given vehicle 100 and/or other vehicles, to the trained neural network model 200, to further train the trained neural network model 200.

Moving to block 418, in another optional subprocess, there is provided, for example, periodically, failure information from one or more of the given vehicle local computer 110 and/or the other vehicles, to the trained neural network model 200, to further train the trained neural network model.

The process moves to block 420, where it ends. The process may be repeated for as long as desired.

The processors 110, for example, may comprise general-purpose computers, which are programmed in software, including trained neural network models, to carry out the functions described herein. The software may be downloaded to the computer in electronic form, over a network, for example, or it may, alternatively or additionally, be provided and/or stored on non-transitory tangible media, such as magnetic, optical, or electronic memory.

Although the embodiments described herein mainly address automotive applications, the methods and systems described herein can also be used in other sorts of vehicular networks, such as in aircraft and boats.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for fault diagnosis in a vehicular communication network, the method comprising:
    downloading a neural network trained model to a local computer associated with the vehicular communication network of a first vehicle, the vehicular communication network comprising communication links, each communication link comprising one or more cables, and the trained neural network model having been trained based on: 1) collected diagnostic information from components of the vehicular communication network of a plurality of second vehicles over a period of time; and 2) collected failure information of the components of the vehicular communication network in the plurality of second vehicles over the period of time; and the trained neural network model having generated, based on the collected diagnostic information, a set of health metrics indicating a likelihood of failure of the components to perform in a vehicular communication network in a specified manner;
    deploying the trained neural network model by the local computer;
    collecting diagnostic information from the components of the vehicular communication network of the first vehicle, the collected diagnostic information including channel quality metrics, including at least one loss metric with respect to a strength of signals transmitted over the cables, and link quality metrics, including a link error rate with respect to data conveyed over the communication links;
    for a given link, which comprises a given cable, inputting the collected diagnostic information, including the at least one loss metric with respect to the given cable and the link error rate with respect to the given link, into the trained neural network model;
    generating, by the trained neural network model, the set of health metrics to predict a state of health of the components of the vehicular communication network, including at least a link health indication with respect to the given link based on both the at least one loss metric with respect to the given cable and the link error rate with respect to the given link,
    wherein the neural network model is trained using an objective function that is a weighted sum of a cross-entropy and a mean-square error with respect to the link health indication and the at least one loss metric; and
    outputting maintenance recommendations based on the set of health metrics generated by the trained neural network model.

2. The method of claim 1, wherein collecting the diagnostic information comprises collecting information from sensors associated with the components of the vehicular communication network in the first vehicle.

3. The method of claim 1, wherein the collected diagnostic information and the output from the first vehicle are periodically provided to the trained neural network model to further train the trained neural network model.

4. The method of claim 1, wherein the failure information from one or more of the first vehicle or the plurality of second vehicles is periodically provided to the trained neural network model to further train the trained neural network model.

5. The method of claim 1, wherein the diagnostic information further comprises at least one input that is selected from a group of inputs including a temperature, a cable length, an accumulated time, a communication speed, a measure of interference, cable type, and chip voltage.

6. The method of claim 1, wherein the at least one loss metric includes one or more parameters selected from a group of parameters including an overall insertion loss (IL), an overall return loss (RL), a near end RL and a far end RL.

7. The method of claim 1, wherein the link quality metric of a communication link in the network further includes a signal to noise ratio (SNR) of the link.

8. The method of claim 5, wherein collecting the diagnostic information for the temperature includes measuring one or more parameters selected from a group of parameters including core temperature and junction temperature of an integrated circuit (IC) chip at one or more locations on the IC chip and ambient temperature.

9. The method of claim 5, wherein collecting the diagnostic information for the accumulated time includes measuring accumulated power up time and system time.

10. The method of claim 1, and comprising outputting from the trained neural network model one or more further outputs selected from a group of outputs including a system reliability indication, one or more warnings, a cable fault indication, a cable fault location, and an IC chip fault indication, which are members of the set of health metrics generated by the trained neural network model.

11. The method of claim 10, wherein the one or more warnings are selected from a group of warnings, which include channel warnings, communication quality warnings, and chip warnings.

12. A system for fault diagnosis in a vehicular communication network comprising:
    a memory of a local computer associated with the vehicular communication network of a first vehicle, the vehicular communication network comprising communication links, each communication link comprising one or more cables, the memory configured for storing a neural network trained model:
    the neural network trained model having been trained based on: 1) collected diagnostic information from components of the vehicular communication network of a plurality of second vehicles over a period of time; and 2) collected failure information of the components of the vehicular communication network in the plurality of second vehicles over the period of time; and
    the neural network trained model having generated, based on the collected diagnostic information, a set of health metrics indicating a likelihood of failure of the components to perform in a vehicular communication network in a specified manner; and
    a processor configured to:

deploy the trained neural network model stored in the memory;

collect diagnostic information from the components of the vehicular communication network of the first vehicle, the collected diagnostic information including channel quality metrics, including at least one loss metric with respect to a strength of signals transmitted over the cables, and link quality metrics, including a link error rate with respect to data conveyed over the communication links;

for a given link, which comprises a given cable, input the collected diagnostic information, including the at least one loss metric with respect to the given cable and the link error rate with respect to the given link, into the trained neural network model;

generate, using the trained neural network model, the set of health metrics to predict a state of health of the components of the vehicular communication network, including at least a link health indication with respect to the given link based on both the at least one loss metric with respect to the given cable and the link error rate with respect to the given link, wherein the neural network model is trained using an objective function that is a weighted sum of a cross-entropy and a mean-square error with respect to the link health indication and the at least one loss metric; and output maintenance recommendations for the components of the vehicular communication network of the first vehicle, based on the set of health metrics generated by the trained neural network model.

13. The system of claim 12, wherein the components of the vehicular communication network in the first vehicle comprise one or more sensors from which the diagnostic information is obtained.

14. The system of claim 12, wherein the components of the vehicular communication network of the first vehicle comprise integrated circuit (IC) chips, from which the diagnostic information is obtained.

15. The system according to claim 12, wherein the one or more cables are selected from a group of cables including shielded cables, unshielded cables, single stranded cables and multi-stranded cables.

16. A computer usable non-transitory storage medium having a computer program embodied thereon for causing a suitably programmed system to diagnose faults in a vehicular communication network, the vehicular communication network comprising communication links, each communication link comprising one or more cables, by performing the following steps when such program is executed on the system, the steps comprising:

downloading a neural network trained model to a local computer associated with the vehicular communication network of a first vehicle, the trained neural network model having been trained based on: 1) collected diagnostic information from components of the vehicular communication network of a plurality of second vehicles over a period of time; and 2) collected information of failures of the components of the vehicular communication network in the plurality of second vehicles over the period of time; and the trained neural network model having generated, based on the collected diagnostic information, a set of health metrics indicating a likelihood of failure of the components to perform in a vehicular communication network in a specified manner;

causing deploying of the trained neural network model by the local computer;

collecting diagnostic information from the components of the vehicular communication network of the first vehicle, the collected diagnostic information including channel quality metrics, including at least one loss metric with respect to a strength of signals transmitted over the cables, and link quality metrics, including a link error rate with respect to data conveyed over the communication links;

for a given link, which comprises a given cable, inputting the collected diagnostic information, including the at least one loss metric with respect to the given cable and the link error rate with respect to the given link, into the trained neural network model;

generating, by the trained neural network model, the set of health metrics to predict a state of health of the components of the vehicular communication network, including at least a link health indication with respect to the given link based on both the at least one loss metric with respect to the given cable and the link error rate with respect to the given link, wherein the neural network model is trained using an objective function that is a weighted sum of a cross-entropy and a mean-square error with respect to the link health indication and the at least one loss metric; and outputting maintenance recommendations based on the set of health metrics generated by the trained neural network model.

* * * * *